United States Patent [19]

McMillan

[11] 4,330,081
[45] May 18, 1982

[54] WATER TEMPERATURE CONTROL SYSTEM FOR A CLOTHES WASHING MACHINE

[75] Inventor: Stephen L. McMillan, Louisville, Ky.

[73] Assignee: General Electric Company, Louisville, Ky.

[21] Appl. No.: 99,453

[22] Filed: Dec. 3, 1979

[51] Int. Cl.³ .................... G05D 23/00; G05B 11/32
[52] U.S. Cl. ............................... 236/12 R; 68/12 R; 364/173
[58] Field of Search .................... 236/12.12, 12.11; 68/12 R; 137/3–6; 364/109, 502, 509

[56] References Cited

U.S. PATENT DOCUMENTS

| | | | |
|---|---|---|---|
| 2,533,624 | 12/1950 | Ray | 236/12 |
| 3,434,488 | 3/1969 | Talbot | 236/12 |
| 3,772,900 | 11/1973 | Hopkins | 68/12 R |
| 3,940,600 | 2/1976 | Alexander et al. | 364/109 |
| 3,987,808 | 10/1976 | Carbonell et al. | 137/3 |
| 4,031,911 | 6/1977 | Frazar | 137/3 |

Primary Examiner—William E. Wayner
Attorney, Agent, or Firm—Radford M. Reams

[57] ABSTRACT

A microprocessor controlled water temperature control system for a clothes washer. The temperature of incoming mixed hot and cold water is periodically sensed, a cumulative average temperature of the mixed water is compared to a desired temperature value stored in memory. When the comparison results in a temperature difference which exceeds a predetermined error limit, the appropriate hot and/or cold water valves are turned on or off causing the average temperature of the mixed water to change toward the desired temperature value.

3 Claims, 2 Drawing Figures

WATER TEMPERATURE CONTROL SYSTEM FOR A CLOTHES WASHING MACHINE

BACKGROUND OF THE INVENTION

This invention relates to laundry machines, and more particularly, to automatic clothes washers that have a system for controlling the temperature of water introduced into the washing machine tub.

Regulating the temperature of water introduced into an automatic washing machine by controlling the operation of the hot and cold water supply valves of the washing machine is well known. Typically, in prior art machines, a temperature responsive switch, such as a thermostat, is used to sense the temperature of the mixed water entering the tub. The output of the thermostat is applied through appropriate control circuit means to control the opening and closing of the hot and cold water valves to achieve an incoming mixed water temperature which is intended to approximate a desired temperature setting which has been inserted by the user by means of a switch mounted on the control panel of the washing machine.

One such typical arrangement that has been utilized is shown in U.S. Pat. No. 2,533,624 and in U.S. Pat. No. 2,619,284 which show the use of a thermostat located in the washing machine tub. Such arrangements, however, result in some rather basic difficulties. In most automatic washing machines, there is a water level control for use with large or small wash loads. With such an arrangement, the thermostat does not have a fixed ideal location on the tub for different selected water fill levels. For instance, if the thermostat is located to enable sensing with low water fill levels, it is then unable to measure accurately the incoming water when high water fill levels are used. Conversely, a thermostat placed high on the tub obviously is not able to sense water temperature when small water loads are employed.

Another arrangement is disclosed in U.S. Pat. No. 2,844,320 wherein the water valves are controlled by a thermostat located along a mutual output water line or a mixing chamber prior to entry of the water into the washing machine tub. Such an arrangement, however, has been found to detrimentally affect both the thermostat and the water valves due to excessive on and off cycling caused by rapid changes in the water temperature occurring in the output water line. In U.S. Pat. No. 4,031,911, this problem is alleviated somewhat by use of a bypass water sampling tank with a pair of thermostatic switches to hold the water introduced into the tub within a temperature range determined by the trip temperatures of the respective thermostatic switches. Although useful for its intended purpose, it nonetheless relies on electromechanical switch devices and a special sampling chamber for its operation. It is desirable that static temperature sensor arrangements be used for greater reliability. Also it is desirable that special sampling chambers be avoided in order to minimize product cost. It is further desirable to provide an improved form of water temperature control that permits greater flexibility in the choice of wash water temperatures best suited to the various synthetic fabrics now commonly in use.

SUMMARY OF THE INVENTION

Therefore, in accordance with the present invention, there is provided an improved water temperature control system for a clothes washing machine that comprises, in part, control means for establishing a control effect representative of a desired water temperature for use in the clothes washing tub. The system includes first and second valve means for supplying incoming cold and hot water, respectively, mixing means for combining the water flow from the valve means before entry into the tub, and means for sensing the temperature of the combined water flow before its entry into the tub. The system further includes means for determining the cumulative average temperature of the combined water flow, means for periodically comparing this average temperature to the aforementioned desired water temperature to determine the difference therebetween, and means responsive to the comparing means, when the difference exceeds a predetermined amount, for actuating said valve means to cause the combined water temperature to change in the direction of approaching the desired water temperature.

DESCRIPTION OF THE PREFERRED EMBODIMENT

Figure 1:
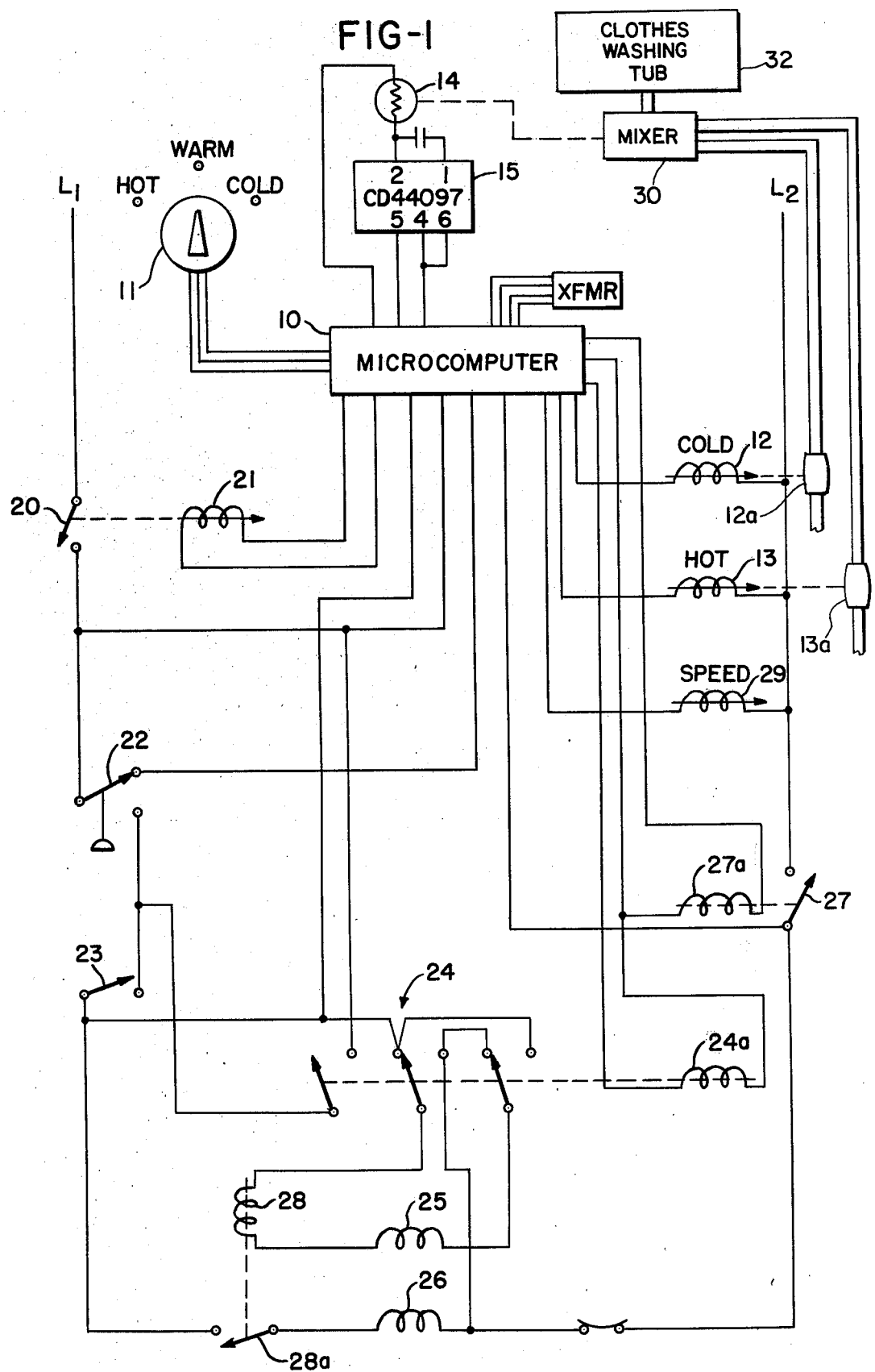
FIG. 1 is a schematic diagram of a water temperature control system in accordance with the present invention.

Referring now to FIG. 1 of the drawing, there is shown a water temperature control system for a clothes washing machine including a microprocessor-based microcomputer 10 having in one input thereto a user-operated control 11 for establishing a control effect representative of a desired water temperature for use in the clothes washing tub. This control effect may consist of one of a plurality of temperature values stored in a Read Only Memory (ROM) in microcomputer 10. Thus control 11 is coupled through appropriate input gating circuits of conventional nature in microcomputer 10 to condition the selected or desired temperature value in the ROM for subsequent use in the operating program of the microcomputer. The desired temperature values may correspond to the presently commonly used settings of cold, warm, and hot as shown in FIG. 1. Alternatively, they may represent temperature values best suited to fabrics in the wash load such as cotton, wool, polyester, etc. Thus, with the present invention, a wide variety of water temperature settings is possible.

The system also includes first and second valve means, 13A and 12A for supplying incoming hot and cold water, and mixing means 30 for combining the water flow from the valve means before entry into the clothes washing tub 32. Any of a number of conventional solenoid controlled water valves may be employed for this purpose, the actuation thereof being effected by solenoids 12 and 13. The mixing means may, for example, take the form of a separate or bypass mixing chamber such as disclosed in the aforementioned U.S. Pat. No. 4,031,911 or it may comprise simply a Y connection in the conduit from the water valves to the conventional air break device, the latter normally included to prevent back flow of water into the household water lines.

Means for sensing the temperature of the combined water flow includes, for example, thermister 14 and a one-shot multivibrator 15 coupled to input gates of microcomputer 10. To sense a temperature, microcomputer 10 sends a pulse to multivibrator 15 to generate a single output pulse, the width of which varies with the resistance of the temperature dependent thermister 14. Microprocessor 10 measures the width of the multivibrator output pulse by decrementing a counter for the duration of the pulse. The resultant count is then representative of the temperature sensed by thermister 14. One of the features of the present invention lies in the use of a static temperature sensor to sense actual water temperature as opposed to a thermostatic device which provides an indication of only a single temperature value, i.e. at its trip point. With such an arrangement, microcomputer 10 may then be preprogrammed to provide means for determining the cumulative average temperature of the combined water flow and means for periodically comparing this average temperature value to the desired temperature value selected from the microcomputer ROM to determine the difference between these two values.

Microcomputer 10 is additionally preprogrammed to provide means responsive to the comparison just performed such that when the determined difference in temperature values, if any, exceeds a predetermined amount, output device circuits in microcomputer 10 are conditioned to actuate either or both of the water valve solenoids 12 and 13 to cause the combined water temperature to change in the direction of approaching the desired water temperature. The particular temperature differential employed in determining when to actuate a water valve solenoid is a function of a trade-off between accuracy of water temperature control and the frequency of valve opening and closing. A representative differential of $\pm 2°$ F. about the desired temperature has been found effective in the performance of this invention. It will be appreciated that microcomputer 10 may be preprogrammed to apply different temperature differentials for each of the desired temperature values.

The remainder of the FIG. 1 circuit represents conventional functional control circuitry for an automatic washing machine. Power is applied from input terminal $L_1$ via on/off switch 20, water level switch 22, lid switch 23 and reversing relay switch 24 to motor windings 25 and 26. The motor windings are returned to power input terminal $L_2$ via relay switch 27. At appropriate times in the cycle, solenoid 27a is actuated to close the contacts of switch 27 to complete the power circuit to the motor windings 25, 26. Solenoid 28 and switch 28a act in conventional manner to place start winding 26 into the circuit temporarily until the motor comes up to speed. Depending on whether the cycle is in the agitate or spin modes, reversing solenoid 24a is conditioned to place the contacts of reversing switch 24 in appropriate position to cause forward or reverse operation of the motor mechanism. Solenoid 29 is provided to actuate, in conventional manner, a speed control arrangement in the drive mechanism typically to provide high and low speed operation of the agitate cycle for normal and delicate wash loads. On/off switch 20 is initially manually closed by the user to start a cycle. It is held closed during the cycle by solenoid 21 under control from microcomputer 10 until the end of the main program at which time solenoid 21 is inactivated thus opening the contacts of switch 20.

Figure 2:
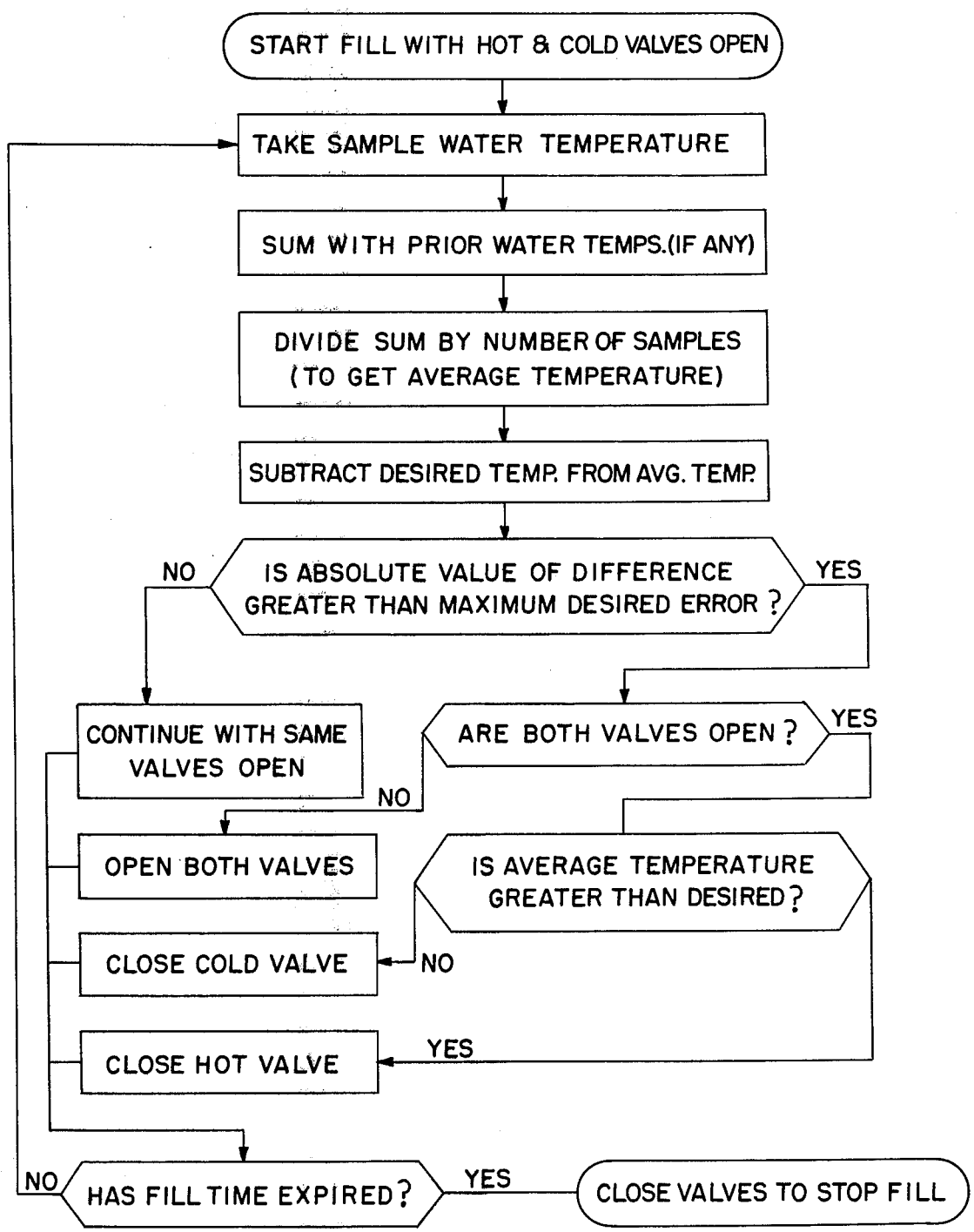
FIG. 2 is a program flow chart for the microcomputer of FIG. 1 from which a program may be readily constructed for the performance of the present invention.

Referring now to FIG. 2, there is shown a program flow chart based on which a suitable operating program may be constructed in well known manner to cause microcomputer 10 to perform the water temperature control in accordance with the present invention. Thus, initially, microcomputer 10 is programmed to start the water fill segment of the cycle with both water valves open. It will be understood that the water fill phase is equally applicable to soak, wash and rinse phases of the washing machine cycle.

The first instruction is to read or sample the water temperature as sensed by the senser circuit including thermister 14. The next instruction causes this sensed temperature to be added to prior sensed water temperatures, if any, which have been stored in a Random Access Memory (RAM) or other temporary memory register in microcomputer 10. The cumulative total is then divided by the number of temperature samples taken to determine the cumulative average of the combined incoming water. It will be appreciated that, for the first cycle, this value represents the actual value of the incoming water mixture although during subsequent repetitive program cycles it will not necessarily represent actual water temperature. This average temperature value is then compared to the selected or desired temperature value from RAM and the difference between the two is calculated to determine the algebraic difference between the two values. The program then enters a decision indicating whether the absolute value of the difference is greater than a maximum error amount which is established in the program as previously described. If the answer is no, indicating the incoming water temperature is within the desired temperature differential range, the instruction is to maintain the water valves unchanged and then determine whether fill time has expired. It will be appreciated that "fill time" in this context may refer to whether the tub has been filled to a desired level as indicated by water level switch 22. Assuming the answer is no, as it will be at the beginning of the water fill phase, the program then recycles and continues to recycle in this manner until an excess temperature differential is determined to exist. The program then determines whether both valves are open. If they are, as they would be at this early point in the water fill phase, a determination is made whether the algebraic value of the temperature difference is higher or lower than the desired temperature and, based on the result of this determination, an instruction is given to close the appropriate valve required to change the combined incoming water temperature back to the desired temperature. Again assuming water fill has not been completed, the program will continue to recycle with the water valves being opened or closed in accordance with the instructions just described until it is finally determined that water fill is completed at which both valves are then closed.

It will be appreciated that there has been described a water temperature control system which provides continual monitoring of incoming water temperature with controls applied to maintain the water temperature within an acceptable range of the desired temperature. A particular advantage of this arrangement is the flexibility of the location of temperature senser 14. It only needs to be located somewhere in the incoming water flow after the hot and cold water have had a chance to mix or combine on the output side of the water valves. Moreover, excessive cycling of the water valves is avoided by appropriate choice of the temperature differential, rate of sampling, of the water temperature, and also by virtue of the fact that cumulative average temperature value of the incoming water is employed in determining whether corrective action is required.

While, in accordance with the patent statutues, there has been described what at present is considered to be the preferred embodiment of the invention, it will be apparent to those skilled in the art that various changes and modifications may be made therein without departing from the invention. It is intended, therefore, by the appended claims to cover all such changes and modifications as fall within the true spirit and scope of the invention.

What is claimed is:

1. Water temperature control system for a clothes washing machine comprising:

control means for establishing a control effect representative of a desired water temperature for use in the clothes washing tub;

first and second valve means for supplying incoming cold and hot water, respectively;

mixing means for combining the water flow from the valve means before entry into the clothes washing tub;

means for sensing the temperature of the combined water flow before entry into the tub;

means for determining the cumulative average temperature of said combined water flow;

means for periodically comparing said average temperature to said desired temperature to determine the difference between said two temperatures;

and means responsive to said comparing means when said difference exceeds a predetermined amount for actuating said valve means to cause said combined water temperature to change in the direction of approaching said desired temperature.

2. The water temperature control system of claim 1 in which said valve means comprise two-state, full on/full off devices.

3. The water temperature control system of claim 2 in which means are included for determining the open or closed state of each of the valve means and in which said means responsive to the comparing means is operative to reverse the state of one or both of said valve means when said temperature difference exceeds said predetermined amount.

* * * * *